US008045630B2

(12) United States Patent
Tanaka et al.

(10) Patent No.: US 8,045,630 B2
(45) Date of Patent: Oct. 25, 2011

(54) SCATTERED PILOT LOCATION DETECTOR

(75) Inventors: Masato Tanaka, Tokyo (JP); Hiroji Akahori, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 970 days.

(21) Appl. No.: 11/905,007

(22) Filed: Sep. 27, 2007

(65) Prior Publication Data

US 2008/0095255 A1  Apr. 24, 2008

(30) Foreign Application Priority Data

Oct. 23, 2006 (JP) .................................. 2006-287154
Mar. 2, 2007 (JP) .................................. 2007-052366

(51) Int. Cl.
*H04L 27/28* (2006.01)
*H04J 11/00* (2006.01)
(52) U.S. Cl. ...................................................... 375/260
(58) Field of Classification Search .................. 375/144, 375/148, 260, 264, 267, 349; 370/208, 210
See application file for complete search history.

(56) References Cited

U.S. PATENT DOCUMENTS

| 2004/0190657 A1* | 9/2004 | Seki et al. ..................... 375/347 |
| 2004/0252629 A1* | 12/2004 | Hasegawa et al. ............ 370/208 |
| 2008/0165871 A1* | 7/2008 | Kisoda et al. ................. 375/260 |

FOREIGN PATENT DOCUMENTS

| JP | 2004-153811 | 5/2004 |
| JP | 2005-045664 | 2/2005 |

* cited by examiner

*Primary Examiner* — Young T. Tse
(74) *Attorney, Agent, or Firm* — Studebaker & Brackett PC; Donald R. Studebaker

(57) ABSTRACT

A detector of patterns corresponding to pilot symbols is capable of detecting patterns of SP symbols promptly without using a TMCC signal. The SP location detector includes a multiplier which multiplies received signals generated by demodulating OFDM modulation signals in which pilot symbols are dispersively disposed in accordance with four types of patterns and which are transmitted periodically by a pseudo-random number bit sequence, four arithmetic circuits which are respectively provided corresponding to the four types of patterns and which respectively extract pilot symbols corresponding to respective patterns from results of multiplication by the multiplier and calculate sums of phase differences between the extracted pilot symbols, followed by outputting absolute values thereof, and a pattern detection circuit which detects the corresponding arithmetic circuit maximum in the calculated absolute value from within the four arithmetic circuits.

9 Claims, 5 Drawing Sheets

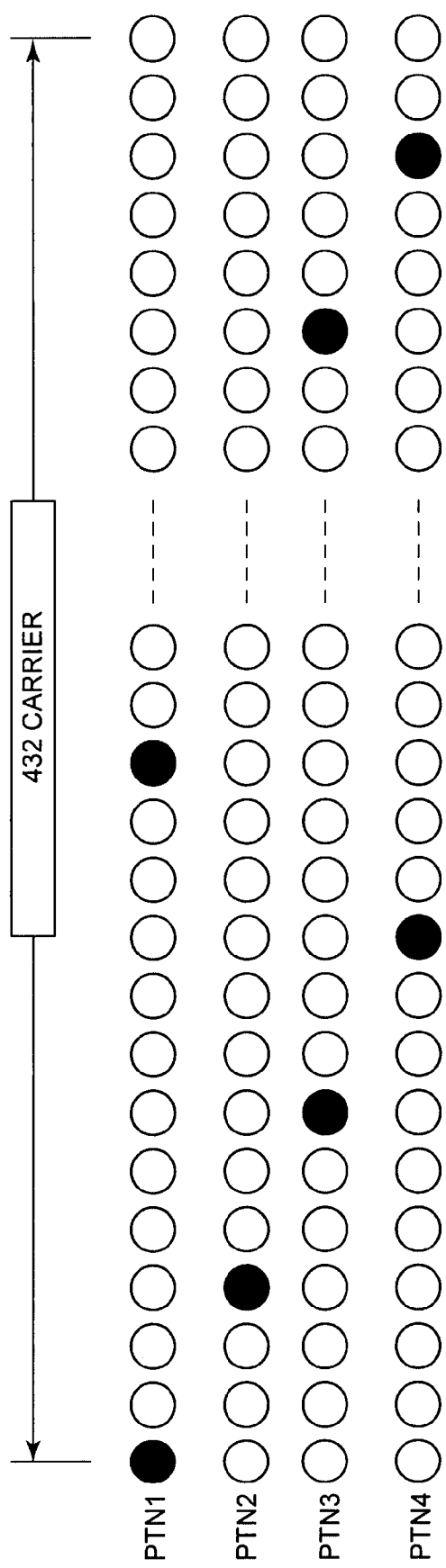

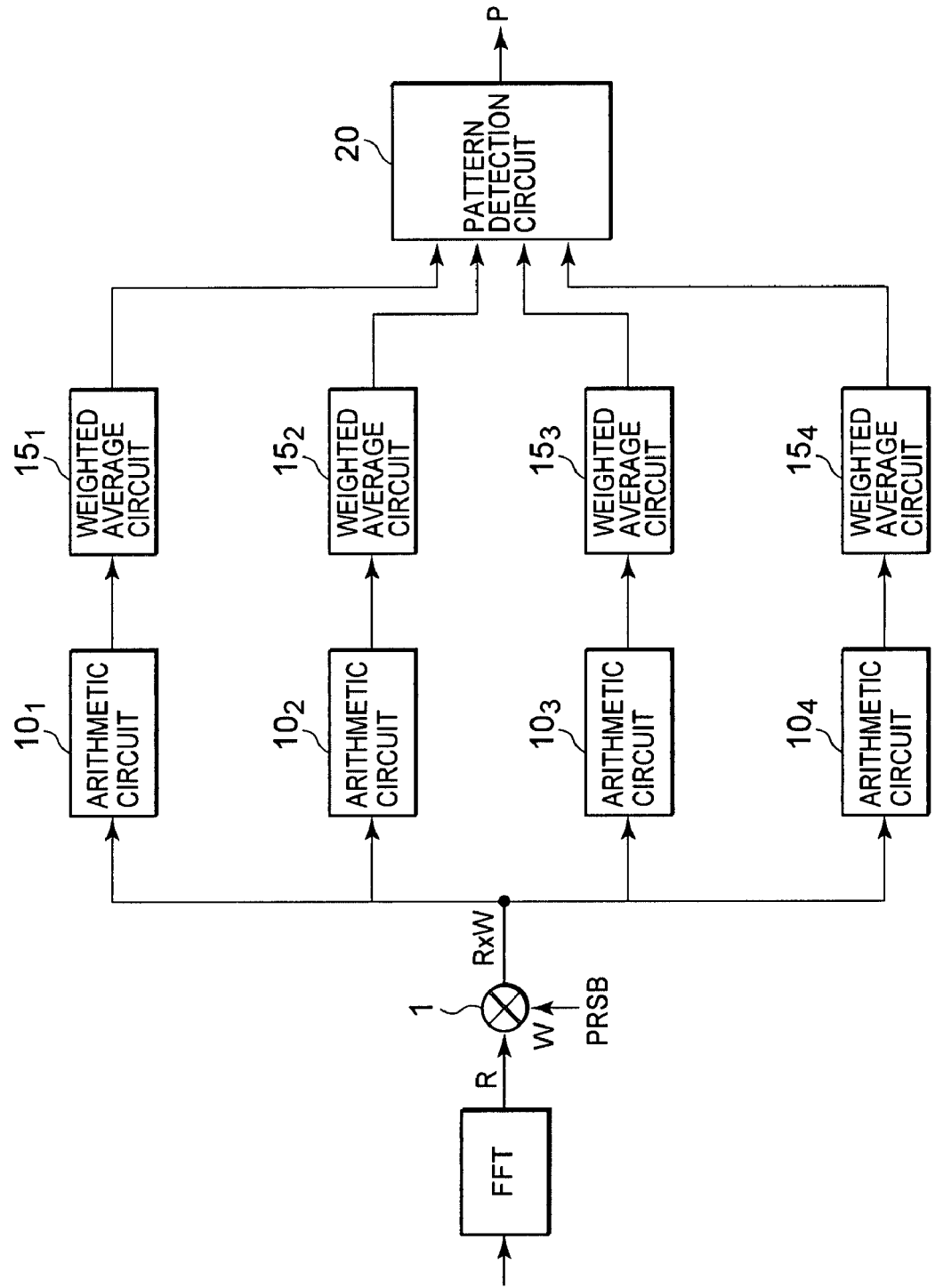

SCATTERED PILOT LOCATION DETECTOR

BACKGROUND OF THE INVENTION

The present invention relates to an SP location detector which detects patterns of scattered pilot (hereinafter called "SP") signals dispersively disposed in received signals in predetermined patterns at ISDB-T (Integrated Services Digital Broadcasting-Terrestrial: Terrestrial Digital Broadcasting) or the like.

As described in patent documents 1 and 2 (Japanese Unexamined Patent Publication Nos. 2004-153811 and 2005-45664), a broadcast signal of ISDB-T is constituted of 13 OFDM (Orthogonal Frequency Division Multiplex) segments (hereinafter called simply "segments") in television broadcasting and one or three segments in radio broadcasting. One segment corresponds to a bundle of a predetermined number of carriers (108 in a mode 1, for example) corresponding to each transmission mode and has a band of about 430 kHz. As the carriers, there are a control information carrier modulated in a predetermined modulation scheme and a data carrier which is modulated in a modulation scheme indicated by the control information carrier and transmits broadcast main information.

At one segment, each carrier is modulated based on each individual complex symbol (corresponding to a so-called IQ symbol that represents an orthogonal component of an information signal in the form of a real part and an imaginary part) for every symbol period or cycle (modulation cycle)) and multiplexed into one OFDM symbol, followed by transmission thereof. 204 OFDM symbols constitute one transmission frame.

FIG. 2 is a diagram showing a configuration example of a transmission frame of ISDB-T. In FIG. 2, carriers are shown so as to be arranged from left to right in increasing order of frequency, and OFDM symbols are shown so as to be arranged from top to bottom in order of time. One complex symbol c (n, k) that modulates a carrier k during a period of a symbol number n, is positioned at a cell at which the carrier and the OFDM symbol intersect. Accordingly, the present figure shows a sequence or arrangement of carriers each corresponding to the complex symbol (n, k) in frequency order and time order.

Symbols described as "SP" in FIG. 2 respectively indicate SP symbols corresponding to pilot symbols each indicative of a reference value used in signal equalization. The SP symbols are respectively transmitted once during 4 symbol periods in order of time according to one per three carriers. The SP symbols are transmitted during all symbol periods in frequency order according to one per twelve carriers.

A symbol described as "TMCC" in FIG. 2 indicates transmission of a TMCC (Transmission and Multiplexing Configuration Control) signal using a predetermined control information carrier. In the TMCC signal, a synchronous symbol indicative of synchronous timing of the frame is contained in the symbol numbers 1 to 16, a segment format identification symbol is contained in the symbol numbers 17 to 19, and a TMCC information symbol indicative of the type of segment, a modulating method and the like is contained in the symbol numbers 20 to 121. Incidentally, the control information carrier is defined so as to be modulated according to a DBPSK (Differential Binary Phase Shift Keying) system.

The symbols undescribed as "SP" or "TMCC" in FIG. 2 are used as data symbols that transmit broadcast main information.

In order to carry out such demodulation of ISDB-T, the TMCC signal receivable without using an equalizer is first received and the synchronous symbol contained in the symbol numbers 1 to 16 is detected, thereby establishing frame synchronism. Next, the corresponding pattern of SP symbols is detected in accordance with the established frame synchronism. Further, information about each SP symbol is received to detect a reference value used for signal equalization, thereby setting the equalizer.

However, the ISDB-T demodulating method has involved the following problems.

(1) While there is a need to establish the synchronism of the OFDM frame for the purpose of detecting each pattern of the SP symbols, the corresponding synchronous symbol in the TMCC signal must be detected to establish the synchronism of the OFDM frame. It is therefore necessary to receive 16 symbols or more corresponding to a synchronous symbol length for synchronous establishment.

(2) Since the TMCC signal is modulated based on the DBPSK system, there is a need to perform differential demodulation for its reception and there is hence a risk of degrading a synchronous characteristic.

SUMMARY OF THE INVENTION

With the foregoing in view, it is therefore an object of the present invention to provide an SP location detector capable of detecting patterns of SP symbols promptly without using a TMCC signal.

According to one aspect of the present invention, for attaining the above object, there is provided a scattered pilot (SP) location detector comprising a multiplier which multiplies received signals generated by demodulating orthogonal frequency division multiplex (OFDM) modulation signals in which pilot symbols are dispersively disposed in accordance with N types of patterns and which are transmitted periodically, by a pseudo-random number bit sequence, N arithmetic circuits which are respectively provided corresponding to the N types of patterns and which respectively extract pilot symbols corresponding to respective patterns from results of multiplication by the multiplier and calculate sums of phase differences between the extracted pilot symbols, and a pattern detection circuit which detects the arithmetic circuit maximum in the calculated sum from within the N arithmetic circuits.

In the present invention, each of the results of multiplication obtained by multiplying received signals by a pseudo random bit sequence is inputted to N arithmetic circuits. The respective arithmetic circuits respectively extract pilot symbols in accordance with their corresponding patterns and calculate sums of phase differences between the extracted pilot symbols, whereby the corresponding arithmetic circuit maximum in the calculated sum is detected from within these N arithmetic circuits. Thus, an advantageous effect is brought about in that patterns of SP symbols can be detected based on received signals corresponding to one symbol period without using a TMCC signal.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a diagram depicting four SP patterns; and

FIG. 5 is a configuration diagram of an SP location detector showing a second embodiment of the present invention.

DETAILED DESCRIPTION OF THE PREFERRED EMBODIMENTS

The above and other objects and novel features of the present invention will become more completely apparent from the following descriptions of preferred embodiments when the same is read with reference to the accompanying drawings. The drawings, however, are for the purpose of illustration only and by no means limitative of the invention.

First Preferred Embodiment

Figure 1:
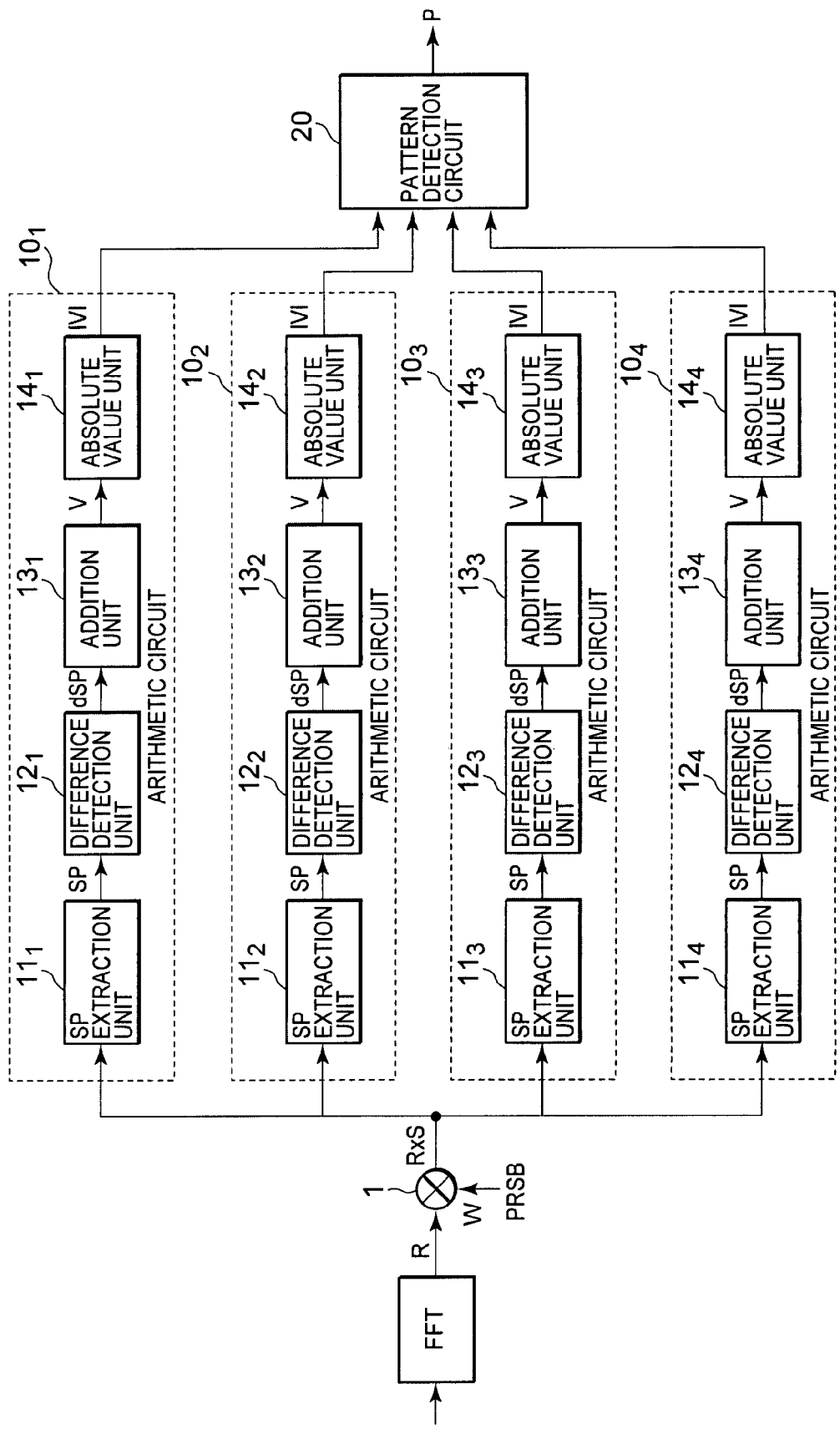
FIG. 1 is a configuration diagram of an SP location detector showing a first embodiment of the present invention.
Figure 2:
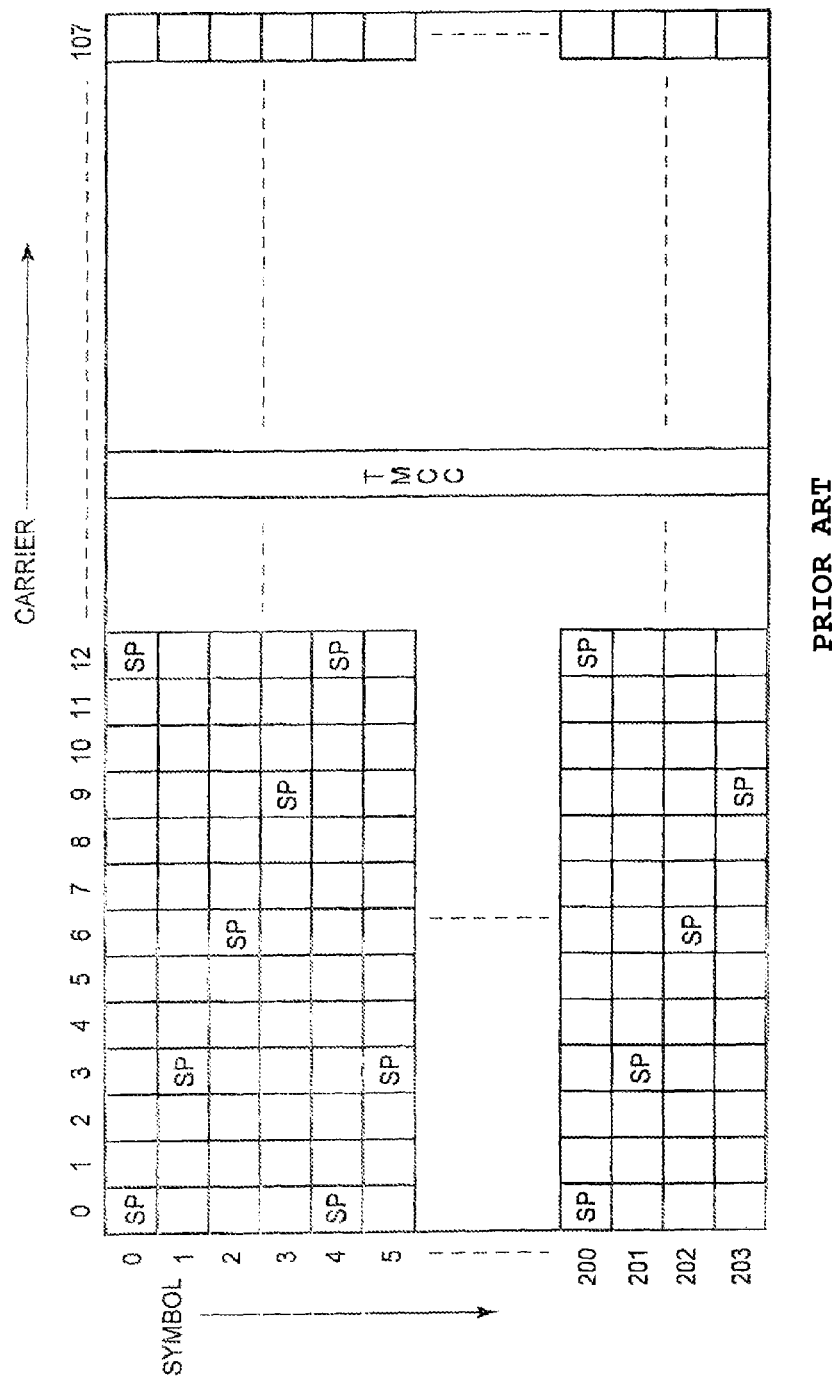
FIG. 2 is a diagram illustrating a configuration example of a transmission frame of ISDB-T.

FIG. 1 is a configuration diagram of an SP layout or location detector showing a first embodiment of the present invention.

The SP location detector has a multiplier 1 which multiplies received signals R (n, k) converted to signals set every carrier constituting segments by a fast Fourier transformer FFT by values W (k) of a pseudo-random number bit sequence PRBS, respectively. Each of the results of multiplication by the multiplier 1 is commonly supplied to four arithmetic circuits $10p$ (where p=1, 2, 3 and 4).

The arithmetic circuits $10p$ execute similar operational or computing processing every four SP patterns. The respective arithmetic circuits $10p$ are respectively constituted of SP extraction units $11p$ which respectively extract SP symbols of patterns p, difference detection units $12p$ which respectively detect phase differences between the SP symbols extracted by the SP extraction units $11p$, addition units $13p$ which respectively calculate the sums of the phase differences detected by the difference detection units $12p$, and absolute value units $14p$ which respectively determine the absolute values of the sums calculated by the addition units $12p$.

The output sides of the four arithmetic circuits $10p$ are connected to a pattern detection circuit 20. The pattern detection circuit 20 detects the maximum value of the values of the results of computations by the four arithmetic circuits $10p$. The result of detection of a corresponding SP location is outputted from the pattern detection circuit 20.

Figure 3:
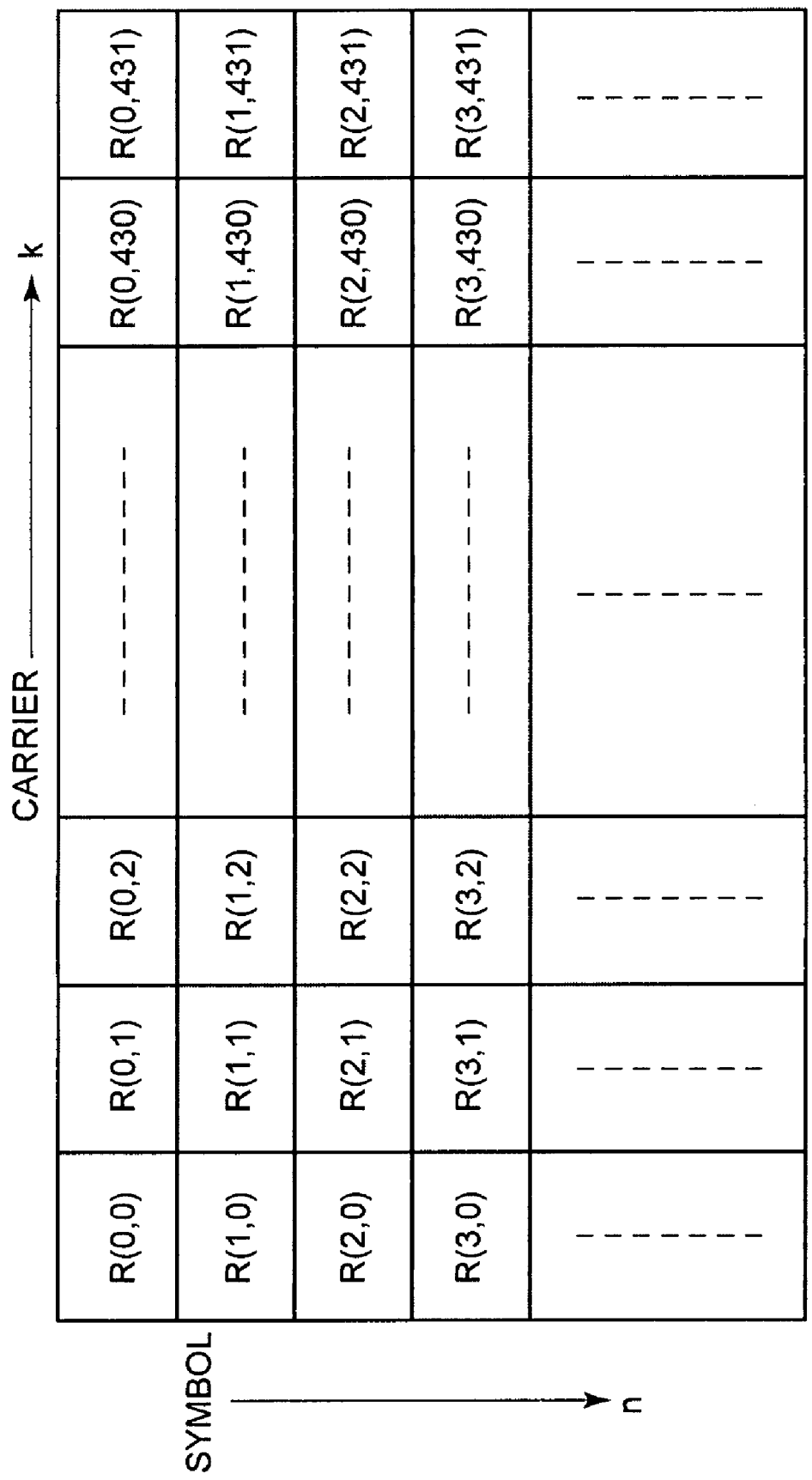
FIG. 3 is a diagram showing the definition of received signals in the present embodiment.

FIG. 3 is a diagram showing the definition of received signals in the present embodiment. FIG. 4 is a diagram showing four SP patterns. The operation of FIG. 1 will be explained below with reference to FIGS. 3 and 4.

The fast Fourier transformer FFT outputs the received signals R (n, k) expressed in complex number converted to the signals set every carrier constituting the segments. In the received signals R (n, k), n indicate symbol numbers arranged in order of time, and k indicate numbers of carriers arranged in order of frequency. In the present embodiment, 432 carriers corresponding to k=0 through 431 are used as shown in FIG. 3.

The received signals R (n, k) are multiplied by the values W (k) of the pseudo-random number bit sequence PRBS and R (n, k)×W (k) corresponding to each of the results of multiplication is commonly supplied to the four arithmetic circuits $10p$.

The SP extraction units $11p$ of the respective arithmetic circuits $10p$ respectively extract SP symbols from the results of multiplication in accordance with the four SP patterns P shown in FIG. 4. Incidentally, the positions of black circles indicate their corresponding SP symbols in FIG. 4. Thus, signals SP (n, p, i) extracted from the respective SP extraction units $11p$ are given from the following equation:

$$SP(n,p,i)=R(n,(p-1)\times 3+j\times 4))\times W(p-1)\times 3+j\times 4) \quad (1)$$

where i indicates SP symbols extracted from the 432 carriers at the rate of one per twelve carriers. i=0, 1, 2, . . . , and 35.

The thirty-six signals SP (n, p, i) extracted from the respective SP extraction units $11p$ are supplied to their corresponding difference detection units $12p$, where phase differences dSP (n, p, i) between the extracted SP symbols are detected in accordance with the following equation:

$$dSP(n,p,i)=SP(n,p,i+1)/SP(n,p,i) \quad (2)$$

where i=0, 1, 2, . . . , and 34.

The phase differences dSP (n, p, i) respectively detected by the difference detection units $12p$ are supplied to their corresponding addition units $13p$, where the sums V (n, p) of the phase differences are respectively calculated as follows:

$$V(n,p)=dSP(n,p,0)+dSP(n,p,1)+ \ldots +dSP(n,p,34) \quad (3)$$

The sums V (n, p) of the phase differences calculated by the respective addition units $13p$ are supplied to their corresponding absolute value units $14p$, where the absolute values |V (n, p)| of the calculated sums are respectively calculated.

Further, the absolute values |V (n, p)| calculated by the respective absolute value units $14p$ are supplied to the pattern detection circuit 20, where the maximum value of the absolute values of the results of calculations by the four arithmetic circuits $10p$ is detected, so that a number p for the corresponding arithmetic circuit $10p$ which outputs this maximum value is outputted. Thus, an SP pattern p corresponding to each symbol number n is detected.

As described above, the first embodiment includes the arithmetic circuits $10p$ which extract the SP symbols every four SP patterns and calculate the absolute values of the sums of the differences between the extracted SP symbols, respectively, and the pattern detection circuit 20 which detects the corresponding arithmetic circuit $10p$ that outputs the maximum absolute value. Thus, the present embodiment has an advantage in that patterns for SP symbols can be detected from received signals corresponding to respective one-symbol periods without using a TMCC signal.

Second Preferred Embodiment

FIG. 5 is a configuration diagram of an SP location detector showing a second embodiment of the present invention. Constituent elements common to those shown in FIG. 1 are given common reference numerals.

In the present SP location detector, weighted average circuits $15p$ each constituted of, for example, an IIR (Infinite Impulse Response) filter is provided on the output sides of the absolute value units $14p$ of the respective arithmetic circuits $10p$ in the SP location detector shown in FIG. 1. The present SP location detector is similar to that shown in FIG. 1 in other configuration.

In the SP location detector, the weighted average circuits $15p$ perform the following arithmetic operation on absolute values |V (n, p)| outputted from the absolute value units $14p$ of the respective arithmetic circuits $10p$, whereby signals S (n, p) are outputted:

$$S(n,p)=\alpha\times S(n-1,(p-1)\bmod 4)+(1-\alpha)\times |V(n,p)| \quad (4)$$

where $\alpha<1$.

Thus, an advantage is brought about in that since each of the signals S (n, p) outputted from the weighted average circuits 15p assumes the weighted average of the result of computation for past symbols and this result of computation, each pattern for SP symbols can be detected in a stable state even under such a poor environment that the state of reception changes every symbol.

Third Preferred Embodiment

Information about the difference between the adjacent SP symbols by the calculation equation employed in each difference detection unit of the first embodiment may assume a frequency characteristic related to a frequency sequence cycle or period for the SP symbols under, for example, a transmission line environment of multipath reception based on equipower. Received power of a specific SP symbol may be very small. Therefore, there is a case in which it is not possible to determine the sequence or arrangement of SP symbols.

The third embodiment has the feature that the phase differences between a plurality of pilot symbols are detected using a plurality of difference signals dSP produced at frequency parallel intervals of different SP symbols extracted by their corresponding SP extraction units 11. Described specifically, the difference calculational equation of the first embodiment is altered in the following manner in the third embodiment.

That is, phase differences dSP1 (n, p, i), dSP2 (n, p, i) and dSP3 (n, p, i) between respective SP symbols, which are expressed in the following equations (5) through (7) in place of the equation (2), are used as calculational equations at respective difference detection units 12p.

$$dSP1(n,p,i)=SP(n,p,i+1)/SP(n,p,i) \text{ (where i=0 to 34)} \quad (5)$$

$$dSP2(n,p,i)=SP(n,p,i+2)/SP(n,p,i) \text{ (where i=0 to 33)} \quad (6)$$

$$dSP3(n,p,i)=SP(n,p,i+3)/SP(n,p,i) \text{ (where i=0 to 32)} \quad (7)$$

The phase differences detected by the respective difference detection units 12p are supplied to their corresponding addition units 13p, where the sum V (n, p) of the phase differences is calculated as follows:

$$V(n,p)=\Sigma\{dSP1(n,p,i)+dSP2(n,p,i)+dSP3(n,p,i)\}$$
(where Σ indicates the sum of i=0 to 34) (8)

Processing subsequent to this is similar to the first embodiment.

As described above, the SP location detector according to the third embodiment has an advantage in that since the differences between the adjacent SP symbols are generated based on the adjacent, next adjacent and further next adjacent three types of phase differences, the locations of SP symbols can be detected even when multipaths are brought into a specific state.

Fourth Preferred Embodiment

According to a fourth embodiment, addition units 13 respectively perform the following addition processing depending on whether arrangement or sequence patterns that assume the maximum values of difference signals dSP generated at frequency parallel intervals of specific pilot symbols by difference detection units 12 coincide with arrangement or sequence patterns that assume the maximum values of difference signals generated at frequency parallel intervals of other pilot symbols. That is, when they coincide with one another, their difference signals are added up together and the maximum values of the sequence patterns are added up together. When they do not coincide with one another, the difference signals large in maximum value are outputted.

Therefore, the calculational equations employed in the third embodiment are altered in the following manner in the fourth embodiment. The following sums V1 (n, p), V2 (n, p) and V3 (n, p) are calculated using the equations (5) through (7).

$$V1(n,p)=dSP1(n,p,0)+dSP1(n,p,1)+\ldots+dSP1(n,p,34) \quad (9)$$

$$V2(n,p)=dSP2(n,p,0)+dSP2(n,p,1)+\ldots+dSP2(n,p,33) \quad (10)$$

$$V3(n,p)=dSP3(n,p,0)+dSP3(n,p,1)+\ldots+dSP3(n,p,32) \quad (11)$$

Assuming now that the values of the patterns p at which the sums V1 (n, p), V2 (n, p) and V3 (n, p) become maximum, are assumed to be P1, P2 and P3 respectively, the value of the sum V (n, p) is calculated under the conditions for the values of these P1 through P3 and the like as follows:

(a) When P1=P2=P3, $$V(n,p)=V1(n,P1)+V2(n,P2)+V3(n,P3) \quad (12a)$$

(b) When P1=P2≠P3, V1(n,P1)≧V3(n,P3) and V2(n,P2)≧V3(n,P3), $$V(n,p)=V1(n,P1)+V2(n,P2) \quad (12b)$$

(c) When P1≠P2=P3, V2(n,P2)≧V1(n,P1) and V3(n,P3)≧V1(n,P1), $$V(n,p)=V2(n,P2)+V3(n,P3) \quad (12c)$$

(d) When P1=P3≠P2, V1(n,P1)≧V2(n,P2) and V3(n,P3)≧V2(n,P2), $$V(n,p)=V1(n,P1)+V3(n,P3) \quad (12d)$$

(e) When P1≠P2, P1≠P3, V1(n,P1)≧V2(n,P2) and V1(n, P1)≧V3(n,P3), $$V(n,p)=V1(n,P1) \quad (12e)$$

(f) When P1≠P2, P2≠P3, V2(n,P2)≧V1(n,P1) and V2(n, P2)≧V3(n,P3), $$V(n,p)=V2(n,P2) \quad (12f)$$

(g) When P1≠P3, P2≠P3, V3(n,P3)≧V1(n,P1) and V3(n, P3)≧V2(n,P2), $$V(n,p)=V3(n,P3) \quad (12g)$$

Processing subsequent to the above is similar to the first embodiment.

Combining the processing of the fourth embodiment and that of the second embodiment makes it possible to prevent error detection.

Fifth Preferred Embodiment

A fifth embodiment shows a case in which the magnitudes of the signals SP (n, p, i) extracted from the respective SP extraction units 11p employed in the first embodiment are ignored and the calculated amounts are reduced by using only a phase relationship.

When the phases of the signals SP (n, p, i) expressed in the equation (1) range from any of 0° to 90°, 90° to 180°, 180° to 270° and 270° to 360°, phase values PSP (n, p, i) are generated as follows:

(a) When Re{SP(n,p,i)}≧0 and Im{SP(n,p,i)}≧0, $$PSP(n,p,i)=0 \quad (13a)$$

(b) When Re{SP(n,p,i)}<0 and Im{SP(n,p,i)}≧0, $$PSP(n,p,i)=1 \quad (13b)$$

(c) When Re{SP(n,p,i)}<0 and Im{SP(n,p,i)}<0, $$PSP(n,p,i)=2 \tag{13c}$$

(d) When Re{SP(n,p,i)}≧0 and Im{SP(n,p,i)}<0, $$PSP(n,p,i)=3 \tag{13d}$$

Here, Re{SP(n,p,i)} and Im{SP(n,p,i)} respectively indicate the values of real and imaginary parts of SP(n,p,i).

Phase differences between respective SP symbols are generated in the following manner using these equations (13a) through (13d):

$$pdSP1(n,p,i)=\{PSP(n,p,i)+PSP(n,p,i+1)\}\bmod 4 \text{ (where } i=0 \text{ to } 34) \tag{14}$$

$$pdSP2(n,p,i)=\{PSP(n,p,i)+PSP(n,p,i+2)\}\bmod 4 \text{ (where } i=0 \text{ to } 33) \tag{15}$$

$$pdSP3(n,p,i)=\{PSP(n,p,i)+PSP(n,p,i+3)\}\bmod 4 \text{ (where } i=0 \text{ to } 32) \tag{16}$$

Further, the equations (14) through (16) are converted to vectors as follows:
(a) When pdSP1(n,p,i)=0, dSP1(n,p,i)=1+j
(b) When pdSP1(n,p,i)=1, dSP1(n,p,i)=−1+j
(c) When pdSP1(n,p,i)=2, dSP1(n,p,i)=−1−j
(d) When pdSP1(n,p,i)=3, dSP1(n,p,i)=1−j
(e) When pdSP2(n,p,i)=0, dSP2(n,p,i)=1+j
(f) When pdSP2(n,p,i)=1, dSP2(n,p,i)=−1+j
(g) When pdSP2(n,p,i)=2, dSP2(n,p,i)=−1−j
(h) When pdSP2(n,p,i)=3, dSP2(n,p,i)=1−j
(i) When pdSP3(n,p,i)=0, dSP3(n,p,i)=1+j
(j) When pdSP3(n,p,i)=1, dSP3(n,p,i)=−1+j
(k) When pdSP3(n,p,i)=2, dSP3(n,p,i)=−1−j
(l) When pdSP3(n,p,i)=3, dSP2(n,p,i)=1−j Processing subsequent to the above is similar to the first embodiment.

The fifth embodiment has advantages in that since the magnitudes of the signals SP (n, p, i) are ignored and the locations of the four SP symbols are detected using only the phase relationship, the calculated amounts are reduced, and simplification of the circuit and a reduction in power consumption can be carried out.

Sixth Preferred Embodiment

Although the phases of the SP symbols are divided into four in the fifth embodiment, the phases are separated into eight at angular intervals of 45° to provide an improvement in accuracy in a sixth embodiment.

The phases of the signals SP (n, p, i) expressed in the equation (1) are divided into eight and the phase values PSP (n, p, i) are generated as follows:

(a) When Re{SP(n,p,i)}≧0 and Im{SP(n,p,i)}≧0, and |Re{SP(n,p,i)}|≧|Im{SP(n,p,i)}|, $$PSP(n,p,i)=0 \tag{17a}$$

(b) When Re{SP(n,p,i)}≧0 and Im{SP(n,p,i)}≧0, and |Re{SP(n,p,i)}|<|Im{SP(n,p,i)}|, $$PSP(n,p,i)=1 \tag{17b}$$

(c) When Re{SP(n,p,i)}<0 and Im{SP(n,p,i)}≧0, and |Re{SP(n,p,i)}|<|Im{SP(n,p,i)}|, $$PSP(n,p,i)=2 \tag{17c}$$

(d) When Re{SP(n,p,i)}<0 and Im{SP(n,p,i)}≧0, and |Re{SP(n,p,i)}|≧|Im{SP(n,p,i)}|, $$PSP(n,p,i)=3 \tag{17d}$$

(e) When Re{SP(n,p,i)}<0 and Im{SP(n,p,i)}<0, and |Re{SP(n,p,i)}|≧|Im{SP(n,p,i)}|, $$PSP(n,p,i)=4 \tag{17e}$$

(f) When Re{SP(n,p,i)}<0 and Im{SP(n,p,i)}<0, and |Re{SP(n,p,i)}|<|Im{SP(n,p,i)}|, $$PSP(n,p,i)=5 \tag{17f}$$

(g) When Re{SP(n,p,i)}≧0 and Im{SP(n,p,i)}<0, and |Re{SP(n,p,i)}|<|Im{SP(n,p,i)}|

$$PSP(n,p,i)=6 \tag{17g}$$

(h) When Re{SP(n,p,i)}≧0 and Im{SP(n,p,i)}<0, and |Re{SP(n,p,i)}|≧|Im{SP(n,p,i)}|, $$PSP(n,p,i)=7 \tag{17h}$$

Phase differences between respective SP symbols are generated in the following manner using these equations (17a) through (17h):

$$pdSP1(n,p,i)=\{PSP(n,p,i)+PSP(n,p,i+1)\}\bmod 8 \text{ (where } i=0 \text{ to } 34) \tag{18}$$

$$pdSP2(n,p,i)=\{PSP(n,p,i)+PSP(n,p,i+2)\}\bmod 8 \text{ (where } i=0 \text{ to } 33) \tag{19}$$

$$pdSP3(n,p,i)=\{PSP(n,p,i)+PSP(n,p,i+3)\}\bmod 8 \text{ (where } i=0 \text{ to } 32) \tag{20}$$

Further, the equations (18) through (20) are converted to vectors as follows:
(a) When pdSP1(n,p,i)=0, dSP1(n,p,i)=a+jb
(b) When pdSP1(n,p,i)=1, dSP1(n,p,i)=c+jd
(c) When pdSP1(n,p,i)=2, dSP1(n,p,i)=−b+ja
(d) When pdSP1(n,p,i)=3, dSP1(n,p,i)=−d+jc
(e) When pdSP1(n,p,i)=4, dSP1(n,p,i)=−a−jb
(f) When pdSP1(n,p,i)=5, dSP1(n,p,i)=−c−jd
(g) When pdSP1(n,p,i)=6, dSP1(n,p,i)=b−ja
(h) When pdSP1(n,p,i)=7, dSP1(n,p,i)=d−jc
(i) When pdSP2(n,p,i)=0, dSP2(n,p,i)=a+jb
(j) When pdSP2(n,p,i)=1, dSP2(n,p,i)=c+jd
(k) When pdSP2(n,p,i)=2, dSP2(n,p,i)=−b+ja
(l) When pdSP2(n,p,i)=3, dSP2(n,p,i)=−d+jc
(m) When pdSP2(n,p,i)=4, dSP2(n,p,i)=−a−jb
(n) When pdSP2(n,p,i)=5, dSP2(n,p,i)=−c−jd
(o) When pdSP2(n,p,i)=6, dSP2(n,p,i)=b−ja
(p) When pdSP2(n,p,i)=7, dSP2(n,p,i)=d−jc
(q) When pdSP3(n,p,i)=0, dSP3(n,p,i)=a+jb
(r) When pdSP3(n,p,i)=1, dSP3(n,p,i)=c+jd
(s) When pdSP3(n,p,i)=2, dSP3(n,p,i)=−b+ja
(t) When pdSP3(n,p,i)=3, dSP3(n,p,i)=−d+jc
(u) When pdSP3(n,p,i)=4, dSP3(n,p,i)=−a−jb
(v) When pdSP3(n,p,i)=5, dSP3(n,p,i)=−c−jd
(w) When pdSP3(n,p,i)=6, dSP3(n,p,i)=b−ja
(x) When pdSP3(n,p,i)=7, dSP3(n,p,i)=d−jc where a, b, c and d indicate arbitrary constants respectively.

Processing subsequent to the above is similar to the first embodiment.

In the sixth embodiment, since the magnitudes of the signals SP (n, p, i) are ignored and the locations of the SP symbols are detected using only a phase relation in a manner similar to the fifth embodiment, the SP symbols can be detected with a small amount of calculation. Further, the sixth embodiment has an advantage in that since the phases are separated into eight, a higher degree of accuracy can be obtained in addition to the advantages of the fifth embodiment.

Incidentally, the present invention is not limited to the above embodiments. Various modifications are possible. As examples of the modifications, there are, for example, ones such as follows:

(a) Although the received signals R having the 432 carriers have been explained by way of example, the number of carriers is not limited to 432, and the present invention can similarly be applied even to the 108 carriers described as the background art, for example.

(b) Although the phase differences are calculated inclusive of amplitude information upon detection of the phase differences dSP between the extracted SP symbols by the difference detection units 12p of the first, third and fourth embodiments, the amplitude information is removed and the phase differences may purely be calculated as in the fifth and sixth embodiments. Thus, it is possible to reduce the amount of operations.

(c) The layout or location patterns of the SP symbols are not limited to ones illustrated in FIG. 4. That is, they can similarly be applied even to received signals generated by demodulating OFDM modulation signals in which pilot symbols are dispersively located or disposed in accordance with arbitrary N types of patterns and which are transmitted periodically. In such a case, the needed number of arithmetic circuits 10 is N in association with the N types of patterns.

What is claimed is:

1. A detector of patterns corresponding to pilot symbols, comprising:
   a multiplier, which multiplies received signals generated by demodulating orthogonal frequency division multiplex modulation signals in which the pilot symbols are dispersively disposed in accordance with N types of patterns and which are transmitted periodically, by a pseudo-random number bit sequence;
   N arithmetic circuits, which are respectively provided corresponding to the N types of patterns and which respectively extract pilot symbols corresponding to the respective patterns from results of multiplication by the multiplier and calculate sums of phase differences between the extracted pilot symbols; and
   a pattern detection circuit, which detects the maximum value in the calculated sum from within the N arithmetic circuits.

2. The detector of patterns corresponding to pilot symbols according to claim 1, wherein the arithmetic circuits respectively comprise
   extraction units, which respectively extract the dispersively-disposed pilot symbols from the results of multiplication by the multiplier according to the corresponding patterns in the N types of patterns,
   difference detection units, which respectively detect phase differences between the pilot symbols extracted by the extraction units,
   addition units, which respectively calculate sums of the phase differences between the pilot symbols which are detected by the difference detection units, and
   absolute value units, which respectively calculate absolute values of the sums of the phase differences calculated by the addition units.

3. The detector of patterns corresponding to pilot symbols according to claim 2, wherein the difference detection units respectively detect phase differences between a plurality of pilot symbols using a plurality of difference signals generated at frequency parallel intervals of the pilot symbols extracted by the extraction units.

4. The detector of patterns corresponding to pilot symbols according to claim 3, wherein when sequence patterns that assume the maximum values of the difference signals generated at the frequency parallel intervals of specific pilot symbols by the difference detection units coincide with sequence patterns that assume the maximum values of the difference signals generated at the frequency parallel intervals of other pilot symbols, the addition units respectively add up their difference signals together and add up the maximum values of the sequence patterns together.

5. The detector of patterns corresponding to pilot symbols according to claim 4, wherein when the sequence patterns that assume the maximum values of the difference signals generated at the frequency parallel intervals of the specific pilot symbols by the difference detection units do not coincide with the sequence patterns that assume the maximum values of the difference signals generated at the frequency parallel intervals of other pilot symbols, the addition units output the difference signals large in maximum value respectively.

6. The detector of patterns corresponding to pilot symbols according to claims 2, wherein the arithmetic circuits are respectively provided with weighted average units which calculate weighted average values obtained by adding the previously-calculated absolute values to the absolute values calculated by the absolute value units and output the weighted average values to the pattern detection circuit.

7. The detector of patterns corresponding to pilot symbols according to claim 2, wherein the difference detection units separate vector components of the pilot symbols extracted by the extraction units into vectors of four values and calculate phase differences between the separated vectors, and thereafter return the phase differences to the vectors corresponding to the four values to detect the phase differences between the pilot symbols, respectively.

8. The detector of patterns corresponding to pilot symbols according to claim 2, wherein the difference detection units separate vector components of the pilot symbols extracted by the extraction units into vectors of eight values and calculate phase differences between the separated vectors, and thereafter return the phase differences to the vectors corresponding to the eight values to detect the phase differences between the pilot symbols, respectively.

9. The detector of patterns corresponding to pilot symbols according to claims 1, wherein the N types of patterns are four, and the pilot symbols are respectively dispersively disposed and transmitted at a rate of once per 4 symbol periods in order of time in accordance with one per three carriers in order of time frequency.

* * * * *